United States Patent
Kim et al.

(10) Patent No.: US 10,590,847 B2
(45) Date of Patent: Mar. 17, 2020

(54) TURBINE INCLUDING FLUE GAS RECIRCULATION COMBUSTOR

(71) Applicant: DOOSAN HEAVY INDUSTRIES & CONSTRUCTION CO., LTD., Changwon-si, Gyeongsangnam-do (KR)

(72) Inventors: Hokeun Kim, Daejeon (KR); Sunghyun Kim, Gimhae-si (KR); Cheahong Choi, Gimje-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 312 days.

(21) Appl. No.: 15/812,898

(22) Filed: Nov. 14, 2017

(65) Prior Publication Data

US 2018/0171869 A1  Jun. 21, 2018

(30) Foreign Application Priority Data

Dec. 21, 2016  (KR) ......................... 10-2016-0175823

(51) Int. Cl.
*F02C 3/34* (2006.01)
*F23C 9/00* (2006.01)
(Continued)

(52) U.S. Cl.
CPC ............... *F02C 3/34* (2013.01); *F02C 9/40* (2013.01); *F23C 9/00* (2013.01); *F23R 3/286* (2013.01);
(Continued)

(58) Field of Classification Search
CPC ........ F23C 9/006; F23C 2202/10; F23C 9/00; F23C 2202/00; F23C 2202/50; F02C 3/34;
(Continued)

(56) References Cited

U.S. PATENT DOCUMENTS 4,130,388 A * 12/1978 Flanagan .................. F23C 7/02
431/10
4,575,332 A  3/1986 Oppenberg et al.
(Continued)

FOREIGN PATENT DOCUMENTS

JP  S51-118126 A  10/1976
JP  S53-119431 A  10/1978
(Continued)

OTHER PUBLICATIONS

European Search Report dated May 24, 2018 in corresponding European Patent Application No. 17202951.4.
(Continued)

*Primary Examiner* — Steven M Sutherland
*Assistant Examiner* — Rodolphe Andre Chabreyrie
(74) *Attorney, Agent, or Firm* — Invenstone Patent, LLC

(57) ABSTRACT

A flue gas recirculation combustor includes a combustor chamber configured such that fuel and combustion gas are injected therein to cause combustion and having a nozzle-side end and a combustor outlet, a nozzle can connected to the nozzle-side end of the combustor chamber, a plurality of nozzles disposed in the nozzle can and configured such that an injection direction thereof is directed to a side of the combustor chamber, and a sleeve disposed in a premixing space defined between the nozzle can and the nozzle-side end of the combustor chamber, the sleeve including a recirculation pathway to recirculate combustion air from the combustor chamber to the premixing space.

16 Claims, 5 Drawing Sheets

(51) Int. Cl.
  *F23R 3/28* (2006.01)
  *F02C 9/40* (2006.01)
(52) U.S. Cl.
  CPC ...... *F05D 2220/32* (2013.01); *F05D 2240/35* (2013.01); *F05D 2260/606* (2013.01); *F23C 2202/10* (2013.01); *F23C 2202/50* (2013.01)
(58) Field of Classification Search
  CPC .... F23R 3/286; F23R 3/16; F23R 3/32; F05D 2220/32; F05D 2240/35; F05D 2270/082
  See application file for complete search history.

(56) References Cited

U.S. PATENT DOCUMENTS

| | | | |
|---|---|---|---|
| 6,029,614 | A | 2/2000 | Kayahara et al. |
| 2002/0187449 | A1 | 12/2002 | Doebbeling et al. |
| 2011/0167828 | A1* | 7/2011 | Singh ........................ F23C 9/00 60/740 |
| 2015/0369126 | A1 | 12/2015 | Knopfel et al. |

FOREIGN PATENT DOCUMENTS

| | | |
|---|---|---|
| JP | H10-160163 A | 6/1998 |
| JP | 2005-061256 A | 3/2005 |
| JP | 2007-156649 A | 6/2007 |
| JP | 2009-127951 A | 6/2009 |
| JP | 2009-198148 A | 9/2009 |
| JP | 5156066 B2 | 3/2013 |
| JP | 6004976 B2 | 10/2016 |
| KR | 10-1989-0004922 A | 5/1989 |
| KR | 10-1583509 B1 | 1/2016 |

OTHER PUBLICATIONS

A Japanese Office Action dated Sep. 18, 2018 in connection with Japanese Patent Application No. 2017-218750 which corresponds to the above-referenced U.S. application.

* cited by examiner

TURBINE INCLUDING FLUE GAS RECIRCULATION COMBUSTOR

CROSS REFERENCE TO RELATED APPLICATION

The present application claims priority to Korean Patent Application No. 10-2016-0175823, filed Dec. 21, 2016, the entire contents of which is incorporated herein for all purposes by this reference.

BACKGROUND

The present disclosure relates generally to a gas turbine. More particularly, the present disclosure relates to a turbine including a flue gas recirculation combustor, wherein NOx (nitrogen oxides) is reduced by recirculating the flue gas to lower the oxygen concentration of premixed fuel (mixture of mist fuel and air) in a combustor chamber that combusts the premixed fuel of fuel and air (mixture of mist fuel and air) injected from a nozzle, NOx (nitrogen oxides) can be reduced by recirculating the flue gas to lower the oxygen concentration in the premixed fuel.

A gas turbine is a rotary type heat engine that drives a turbine with high temperature and high pressure combustion gas. To create the high-temperature and high-pressure combustion gas, a mixture of fuel and air injected from the combustion nozzle must be combusted in the combustion chamber provided in the combustor. While combustion continues, the gas turbine continues to operate until fuel and air supply (especially, the fuel supply) is stopped.

In the gas turbine, self-sustaining combustion of fuel/air mixture supplied to the combustion chamber by the heat generated occurs only when the initial combustion of the fuel/air mixture is initiated and a high temperature environment is created in the combustion chamber. Accordingly, in order to operate a stopped gas turbine, an igniter is used to generate an artificial combustion for the initial mixture.

The igniter may be of the type that emits electrical energy or uses electrical energy to heat an end portion thereof, or it may be of an ignition torch type that burns the fuel.

The fuel/air mixture combusted in the combustor chamber emits a large amount of nitrogen oxides (NOx). In this case, nitrogen oxides, as pollutants, must be reduced to avoid environmental pollution. To achieve this, a method of suppressing the generation of nitrogen oxides by reducing the oxygen concentration contained in the combusting fuel/air mixture can be used.

In the combustion process of a conventional gas turbine, the temperature of the combustion process is controlled to limit the emission of nitrogen oxides. However, it is very difficult to control the oxygen concentration only with an internal device of the gas turbine. As a result, the efficiency of reducing the nitrogen oxide concentration is low. Accordingly, securing the effect of sufficiently reducing the nitrogen oxide concentration only by the conventional structure has been problematic, so structural improvement is needed.

SUMMARY

The present disclosure provides a solution to the above problems occurring in the related art. An object of the present disclosure is to provide a gas turbine, which is operated by igniting a mixture of fuel and air injected into a combustion chamber thereof, having a bypass path or an ejector nozzle at a side of the combustor chamber to lower the oxygen concentration of fuel.

To achieve the above object, in an aspect of the present disclosure, there is provided a flue gas recirculation combustor including a combustor chamber configured such that fuel and combustion gas are injected therein to cause combustion, a nozzle-side end with a nozzle can and a plurality of nozzles connected thereto, and a combustor outlet, wherein the nozzle can is connected to the nozzle-side end of the combustor chamber and the plurality of nozzles are inserted into the nozzle can, and configured such that an injection direction thereof is directed to a side of the combustor chamber, wherein a sleeve provided in a premixing space defined between the nozzle can and the nozzle-side end of the combustor chamber is provided with at least one of a bypass path and an ejector nozzle.

Herein, the plurality of nozzles may be arranged to form at least one concentric circle based on a center of the nozzle can having a circular longitudinal section, with the nozzles arranged to be spaced from each other at predetermined intervals in one circular nozzle arrangement.

Further, the plurality of nozzles may be configured such that combustion air and fuel are premixed therein and injected therefrom.

Still further, the bypass path or the ejector nozzle may be provided through the sleeve arranged between the nozzle can and the nozzle-side end of the combustor chamber connected to the nozzle can, with at least one or more thereof provided on an inner surface of the sleeve along a circumferential direction.

Herein, both the bypass path and the ejector nozzle may be provided through the sleeve, with the ejector nozzle provided between one bypass path and neighboring bypass path, the bypass path being configured such that at least one or more thereof are provided at a predetermined interval on the inner surface of the sleeve along the circumferential direction.

The ejector nozzle may include a nozzle casing provided in the sleeve through the same, an injection control needle assembly provided in the nozzle casing, a combustor flow path connecting at least one point of the nozzle casing and a side of the combustor chamber, and a premix flow path connecting a side of the nozzle casing and the premixing space.

The nozzle casing may be in a cylindrical shape with an end thereof closed, and the nozzle casing may include a narrowed part provided at an open end of the nozzle casing to inject gases in the combustor chamber to the premixing space, and a partition dividing the cylindrical nozzle casing by longitudinally bisecting the same.

The injection control needle assembly may include a needle longitudinally provided at a center of the cylindrical nozzle casing with an end thereof closed, a movable member provided at an end of the needle to allow the needle to move horizontally along the center of the nozzle casing, a first elastic member provided between the partition of the nozzle casing and the movable member, and a second elastic member provided between the movable member and the closed end of the nozzle casing.

The injection control needle assembly may further include an elasticity adjusting member screwed to the closed end of the nozzle casing to be connected to the second elastic member.

The injection control needle assembly may further include at least one ring stopper limiting horizontal movement of the movable member in the nozzle casing.

Further, the combustor flow path may be configured such that an inlet end thereof is provided at the nozzle-side end of the combustor chamber and an outlet end thereof is provided at a side of the nozzle casing, and the outlet end includes a combustor pressure path communicating with a space between the partition and the movable member, and a recirculation flow path communicating with an injection path in the nozzle casing.

Still further, the premix flow path may be configured such that an inlet end thereof is provided at a nozzle-side end of the sleeve and an outlet end thereof is provided at a side of the nozzle casing, with the outlet end communicating with a space between the movable member and the closed end of the nozzle casing.

According to a turbine including a flue gas recirculation combustor of the present disclosure configured as described above, it is possible to reduce the amount of nitrogen oxides (NOx) contained in the exhaust gas.

In particular, the premixing space provided between a plurality of nozzles and the combustor chamber, and the bypass path or the ejector nozzle provided in the sleeve are configured such that their shapes and installation positions have optimum efficiency and are self-driven.

Accordingly, by providing a turbine including the bypass path or the ejector nozzle configured as described above, it is possible to reduce the amount of nitrogen oxides (NOx) contained in the exhaust gas regardless of the combustion temperature.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Figure 1:
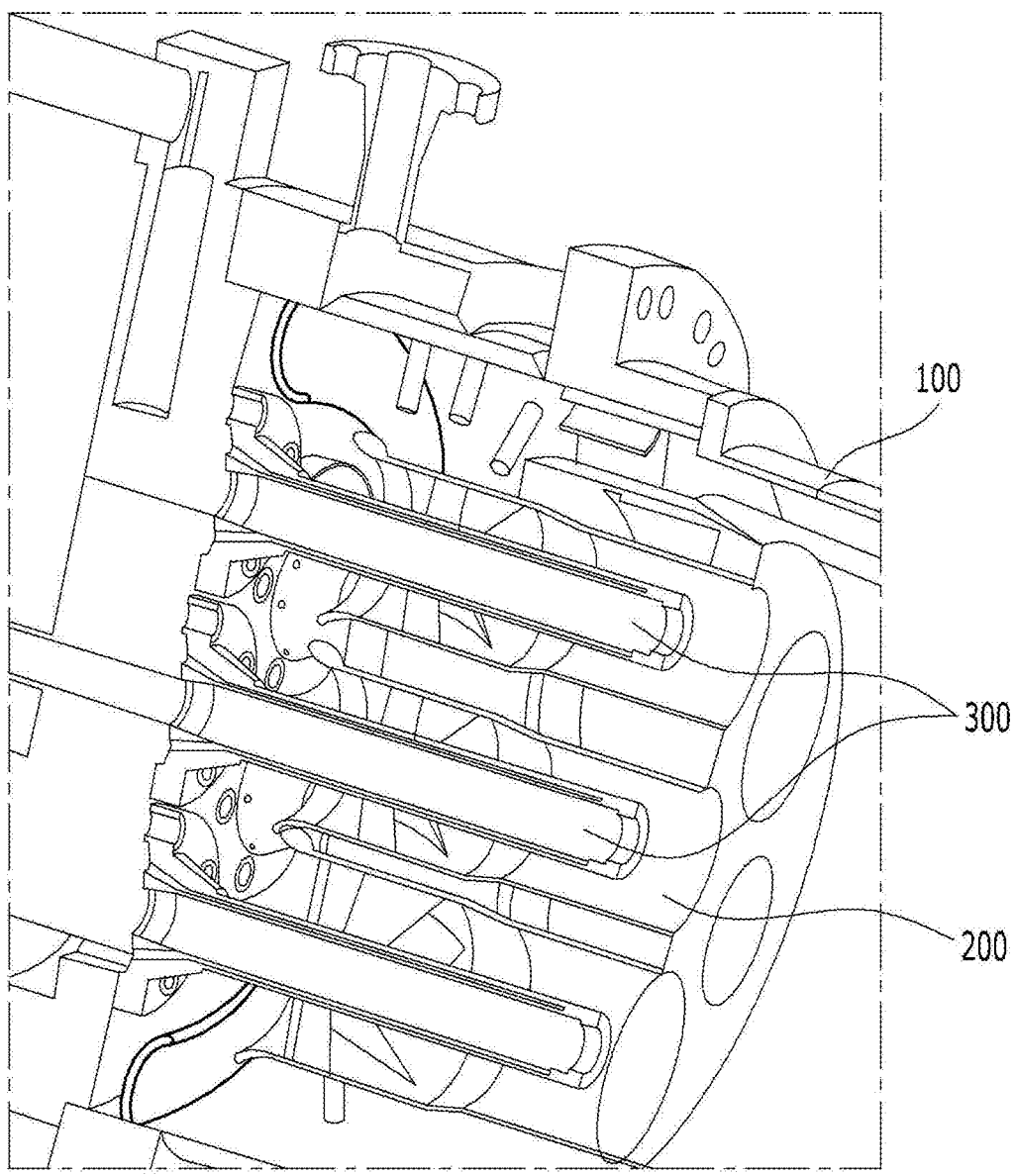
FIG. 1 is a perspective view showing an exemplary embodiment of a gas turbine combustor including a combustor chamber, nozzles, and a nozzle can.

Hereinbelow, exemplary embodiments of the present disclosure will be described in detail with reference to the accompanying drawings.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

It will be further understood that, although the terms first, second, etc. may be used herein to describe various elements, these elements should not be limited by these terms. These terms are only used to distinguish one element from another.

Also, the terms "~part", "~unit", "module", "apparatus" and the like mean a unit for processing at least one function or operation and may be implemented by a combination of hardware and/or software.

It should be noted that the same reference numerals are used to designate the same or similar elements throughout the drawings. In the following description of the present disclosure, detailed descriptions of known functions and configurations which are deemed to make the gist of the present disclosure obscure will be omitted.

Hereinbelow, the terms used in describing the present disclosure are simply defined as follows.

FIG. 1 is a perspective view showing a gas turbine including a combustor chamber 100, a nozzle can 200, and nozzles 300 according to an exemplary embodiment of the present disclosure. The combustion process of the gas turbine is performed in such a manner that the fuel sprayed in the form of mist through the nozzles 300 and the combustion air required for combustion are supplied to the combustor chamber 100, and the ignition proceeds in the combustor chamber 100. Depending on the embodiment, the fuel and air may be premixed in an annular space between the nozzles 300 and the nozzle can 200 before being supplied to the combustor chamber 100.

Figure 2:
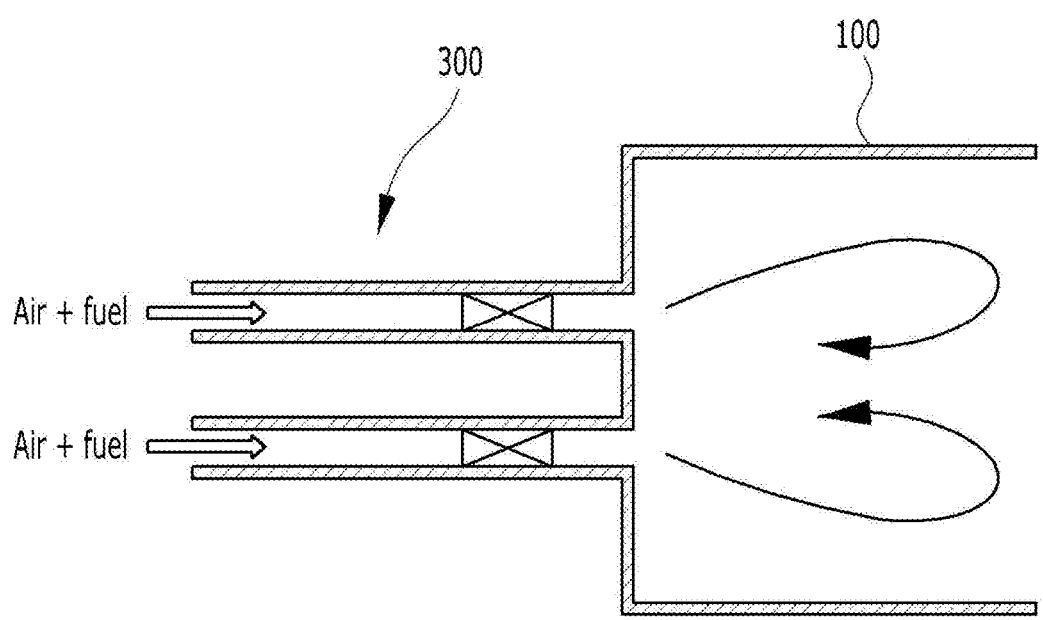
FIG. 2 is a schematic view showing a conventional gas turbine combustor including a combustor chamber and nozzles.

FIG. 2 is a schematic view showing a gas turbine combustor including a combustor chamber 100 and nozzles 300 according to an embodiment of the conventional art. As shown in FIG. 2, the conventional art is problematic in that there is no internal device capable of controlling the oxygen concentration of the mixture mixed in the premixing space, so the amount of nitrogen oxides in the discharged exhaust gas is considerable. Further, it can also be seen that there is no additional configuration to supply the combustion air in the combustion chamber to the premixing space or to mix the combustion air with premixed air.

In this case, as described above, nitrogen oxides (NOx) are generated in the combustion process. An exemplary embodiment of the present disclosure includes at least one of a bypass path and an ejector nozzle, whereby it is possible to efficiently lower the oxygen concentration in the mixer produced by mixing the fuel sprayed in the form of mist through the nozzles 300 with the combustion air by blowing the combusted air present in the combustor chamber 100 into a premixing space as described in more detail below.

Figure 3A:
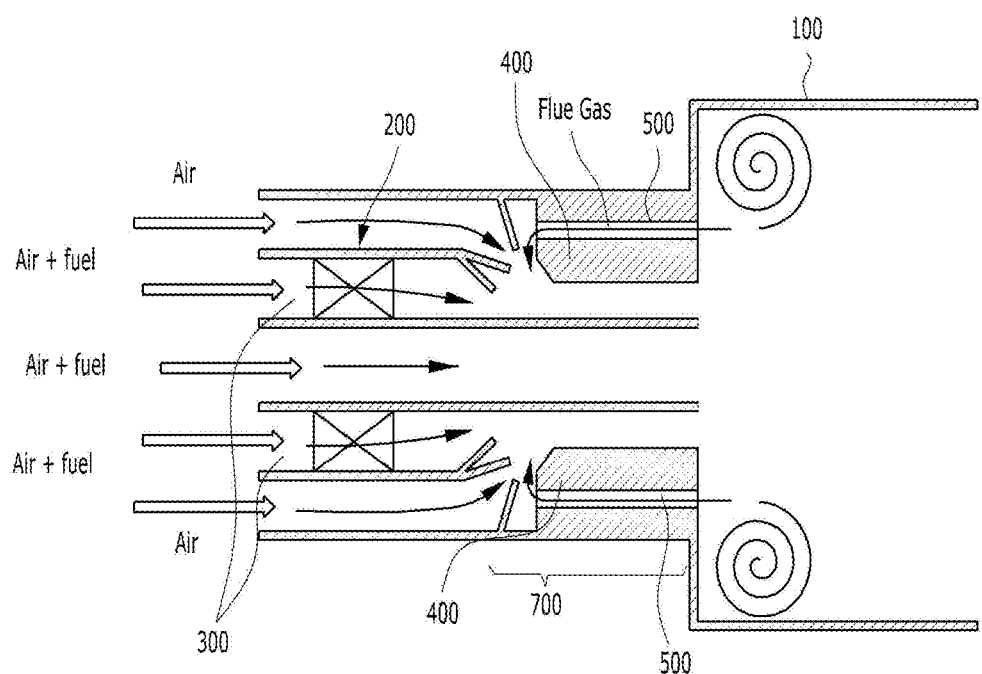
FIG. 3A is a schematic view showing an exemplary embodiment of a gas turbine combustor including bypass paths.
Figure 3B:
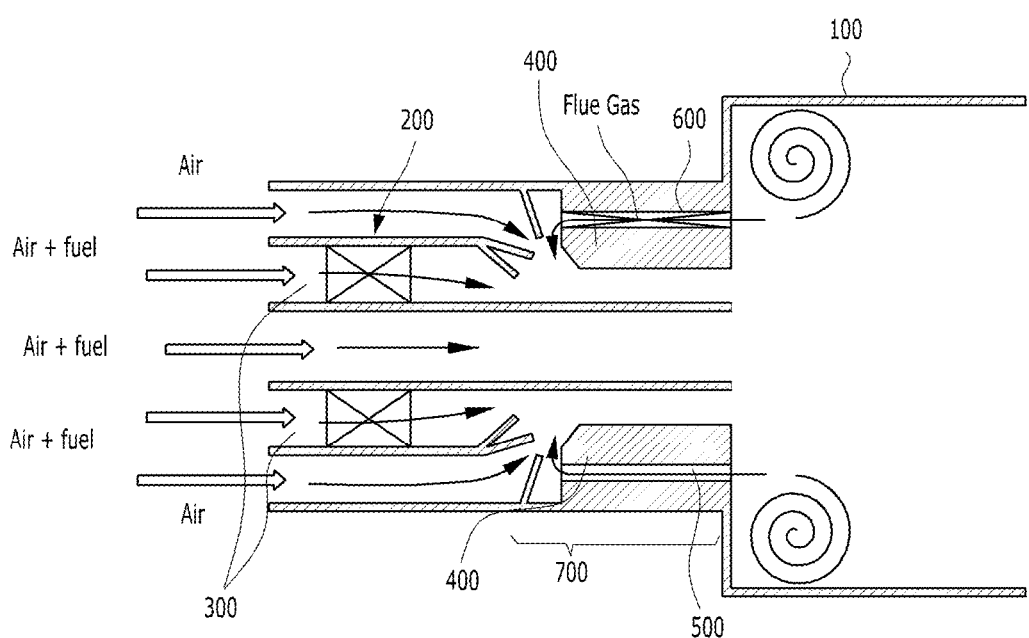
FIG. 3B is a schematic view showing an exemplary embodiment of a gas turbine combustor including bypass paths and ejector nozzles.

FIGS. 3A and 3B are schematic views showing a gas turbine including a combustor chamber 100 and nozzles 300 according to exemplary embodiments of the present disclosure. As shown in FIG. 3A, bypass path 500 is provided to lower the oxygen concentration of the mixer.

More specifically, a combustor of a gas turbine according to an exemplary embodiment includes a flue gas recirculation combustor comprising a combustor chamber 100 configured such that fuel and combustion gas are injected therein to cause combustion, a nozzle-side end with a nozzle can 200 and a plurality of nozzles 300 connected thereto, and a combustor outlet. The nozzle can 200 is connected to the nozzle-side end of the combustor chamber 100 and the plurality of nozzles 300 are inserted into the nozzle can 200 and configured such that an injection direction thereof is directed to a side of the combustor chamber 100, wherein a sleeve 400 provided in a premixing space 700 defined between the nozzle can 200 and the nozzle-side end of the combustor chamber 100 is provided with at least one of a bypass path 500 and an ejector nozzle 600.

In this case, the plurality of nozzles 300 may be arranged to form at least one concentric circle based on a center of the nozzle can 200 having a circular longitudinal section, with the nozzles 300 arranged to be spaced from each other at predetermined intervals in one circular nozzle arrangement. It is preferable that the combustion air and fuel are premixed and injected. Through this nozzle arrangement, it is possible to smoothly mix fuel, air, and fuel/air mixture in the premixing space 700.

Further, the bypass path 500 or the ejector nozzle 600 may be provided through the sleeve 400 arranged between the nozzle can 200 and the nozzle-side end of the combustor chamber 100 connected to the nozzle can 200, with at least one or more thereof provided on an inner surface of the sleeve 400 along a circumferential direction. Further, as shown in FIG. 3, both the bypass path 500 and the ejector nozzle 600 may be provided through the sleeve 400, with the ejector nozzle 600 provided between one bypass path 500 and neighboring bypass path 500, the bypass path 500 configured such that at least one or more thereof are provided at a predetermined interval on the inner surface of the sleeve 400 along the circumferential direction.

It may be possible to provide only the bypass path 500 on the inner surface of the sleeve 400 along the circumferential direction, or may be possible to provide only the ejector nozzle 600 in the inner surface of the sleeve 400 along the circumferential direction.

It may be also possible to alternately install the bypass path 500 and the ejector nozzle 600 on the inner surface of the sleeve 400 along the circumferential direction in order to reduce nitrogen oxides.

Using the bypass path 500, it is possible to obtain a mixing effect due to natural flow resulting from the pressure difference between the combustor chamber 100 and the premixing space 700. However, in the case of the ejector nozzle 600 according to an exemplary embodiment of the present disclosure, it is possible to control the injection amount using the pressure difference. Therefore, a gas turbine capable of reducing nitrogen oxides at low cost and high efficiency may be achieved by appropriately disposing the ejector nozzle 600.

Since the bypass path 500 is configured such that a first end thereof is formed in the combustor chamber 100 in which the combustion air is formed at a high pressure, and a second end thereof is formed in the premixing space 700, it is possible to naturally deliver the high-pressure combustion air (i.e., air with a relatively large amount of nitrogen oxides and carbon dioxide) to the premixing space 700. Accordingly, by having such a configuration, it is possible to naturally deliver the high-pressure combustion air to the premixing space 700 without providing a separate driving force.

Next, an exemplary configuration of a self-driven ejector nozzle 600 that may be included in the present disclosure will be described in detail.

Figure 4:
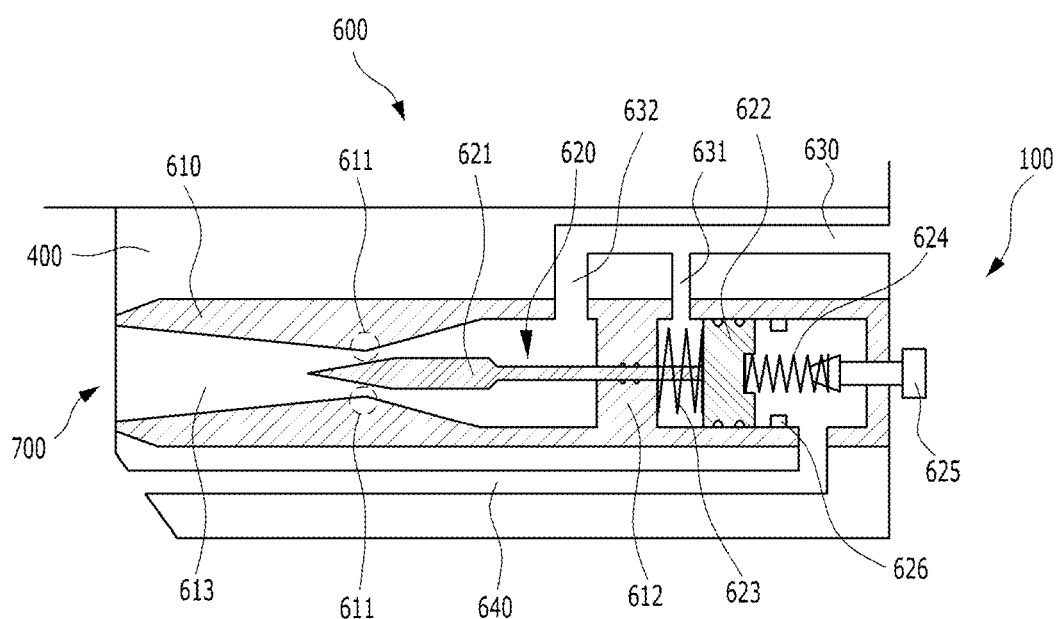
FIG. 4 is a longitudinal sectional view showing an exemplary embodiment of an ejector nozzle.

FIG. 4 is a longitudinal sectional view showing the ejector nozzle 600 according to an exemplary embodiment of the present disclosure. Referring to FIG. 4, an exemplary configuration of an ejector nozzle 600, which is a component of the present disclosure, self-driven, and capable of injection control, is shown.

More specifically, ejector nozzle 600 includes a nozzle casing 610 provided in the sleeve 400 shown in FIG. 3, an injection control needle assembly 620 provided in the nozzle casing 610, a combustor flow path 630 connecting at least one point of the nozzle casing 610 and a side of the combustor chamber 100, and a premix flow path 640 connecting a side of the nozzle casing 610 and the premixing space 700.

In this case, the nozzle casing 610 may be in a cylindrical shape with an end thereof closed, and the nozzle casing may include a narrowed part 611 provided at an open end of the nozzle casing 610 to inject gases in the combustor chamber 100 to the premixing space 700, and a partition 612 dividing the cylindrical nozzle casing 610 by longitudinally bisecting the same.

Further, the injection control needle assembly 620 may include a needle 621 longitudinally provided at a center of the cylindrical nozzle casing 610 with an end thereof closed, a movable member 622 provided at an end of the needle 621 to allow the needle 621 to move horizontally along the center of the nozzle casing 610, a first elastic member 623 provided between a partition 612 of the nozzle casing 610 and the movable member 622, a second elastic member 624 provided between the movable member 622 and the closed end of the nozzle casing 610, and an elasticity adjusting member 625 screwed to the closed end of the nozzle casing 610 to be connected to the second elastic member 624.

Herein, the injection control needle assembly 620 may further include at least one ring stopper 626 limiting horizontal movement of the movable member 622 in the nozzle casing 610.

Further, the combustor flow path 630 is configured such that an inlet end thereof is provided at the nozzle-side end of the combustor chamber 100 and an outlet end thereof is provided at a side of the nozzle casing 610. In particular, the outlet end includes a combustor pressure path 631 communicating with a space between the partition 612 and the movable member 622, and a recirculation flow path 632 communicating with an injection path 613 in the nozzle casing 610.

In addition, the premix flow path 640 is configured such that an inlet end thereof is provided at a nozzle-side end of the sleeve 400 and an outlet end thereof is provided at a side of the nozzle casing 610, with the outlet end communicating with a space between the movable member 622 and the closed end of the nozzle casing 610.

High pressure combustion air in the combustor chamber 100 naturally enters the combustor flow path 630, and the combustion air naturally entering the combustor flow path 630 splits into the combustor pressure path 631 and the recirculation flow path 632 and is introduced into the nozzle casing 610. The combustion air introduced into the nozzle casing 610 through the combustor pressure path 631 provides a force to push the movable member 622 in a direction toward the combustor chamber 100, and when the combustion air is supplied at a predetermined pressure or more, backward movement is restricted by the ring-shaped ring stopper 626 provided at least one inside the nozzle casing 610.

When a force pushing the movable member 622 toward the combustor chamber 100 is applied, the needle 621 connected to the movable member 622 is also moved backward, and the gap between the narrowed part 611 and the needle 621 is increased, thereby increasing the amount of combustion air injected through the injection path 613. In this case, most of the combustion air delivered from the combustor chamber 100 through the recirculation flow path 632 is transferred to the premixing space 700.

On the same principle, when the pressure of the premixed air introduced into the combustor chamber 100 is higher than the pressure of the combustion air introduced into the nozzle casing 610, a force pushing the movable member 622 in the direction of the premixing space 700 is applied, and in this case, the needle 621 connected to the movable member 622 is also moved forward. Accordingly, the gap between the narrowed part 611 and the needle 621 is reduced, whereby the amount of combustion air injected through the injection path 613 is reduced.

Also in this case, when the premixed air is supplied at a predetermined pressure or more, forward movement may be restricted by another ring stopper, not shown, provided at least one inside the nozzle casing 610.

It may also be desirable to provide an elasticity adjusting member 625 that is screwed to the closed end of the nozzle casing 610. The elasticity adjusting member 625 is connected to the movable member 622 via the second elastic member 624, wherein by rotating the elasticity adjusting member 625 to adjust the preload of the second elastic member 624, it is possible to adjust the operational sensitivity of the movable member 622 in response to the pressure of the combustion air introduced into the nozzle casing 610 and the pressure of the premixed air introduced into the combustor chamber 100.

It should be understood that the present disclosure is not limited to the exemplary embodiments but may be varied without departing from the technical aspects of the present disclosure.

Therefore, the embodiments disclosed in the present disclosure are not restrictive but are illustrative, and the scope of the technical idea of the present disclosure is not limited to the disclosed exemplary embodiments. Accordingly, the scope of the present disclosure should be interpreted by the accompanying claims. Further, it is to be understood that various alternatives, modifications, and equivalents fall within the spirit and scope of the present invention as defined by the appended claims.

What is claimed is:

1. A flue gas recirculation combustor comprising:
   a combustor chamber configured to receive fuel and combustion gas to cause combustion, the combustor chamber including
      a nozzle-side end and
      a combustor outlet;
   a nozzle can connected to the nozzle-side end of the combustor chamber;
   a plurality of nozzles disposed in the nozzle can and arranged such that an injection direction thereof is directed to a side of the combustor chamber; and
   a sleeve disposed in a premixing space defined between the nozzle can and the nozzle-side end of the combustor chamber, the sleeve including
      a recirculation pathway to recirculate combustion air from the combustor chamber to the premixing space, the recirculation pathway including
         a bypass path and
         an ejector nozzle, the ejector nozzle including
            a nozzle casing,
            an injection control needle assembly disposed in the nozzle casting,
            a combustor flow path connecting at least one point of the nozzle casting and the nozzle-side end of the combustor chamber, and
            a premix flow path connecting a side of the nozzle casting and the premixing space.

2. The flue gas recirculation combustor of claim 1, wherein the plurality of nozzles is configured to premix and inject combustion air and fuel.

3. The flue gas recirculation combustor of claim 1, wherein the recirculation pathway is provided on an inner surface of the sleeve along a circumferential direction.

4. The flue gas recirculation combustor of claim 1, wherein the nozzle casing has a closed end, the nozzle casing including a narrowed portion provided at an open end of the nozzle casing to inject gases from the combustor chamber to the premixing space, and a partition longitudinally dividing the nozzle casing.

5. The flue gas recirculation combustor of claim 4, wherein the injection control needle assembly includes
   a needle arranged longitudinally at a center of the nozzle casing,
   a movable member arranged at an end of the needle to move the needle horizontally along the center of the nozzle casing,
   a first elastic member arranged between the partition of the nozzle casing and the movable member, and
   a second elastic member provided between the movable member and the closed end of the nozzle casing.

6. The flue gas recirculation combustor of claim 5, wherein the injection control needle assembly further includes an elasticity adjusting member arranged at the closed end of the nozzle casing to be connected to the second elastic member.

7. The flue gas recirculation combustor of claim 5, wherein the injection control needle assembly further includes at least one ring stopper to limit horizontal movement of the movable member in the nozzle casing.

8. The flue gas recirculation combustor of claim 5, wherein an inlet end of the combustor flow path is connected to the nozzle-side end of the combustor chamber and an outlet end of the combustor flow path is connected to a side of the nozzle casing, the outlet end including
   a combustor pressure path communicating with a space between the partition and the movable member, and
   a recirculation flow path communicating with an injection path in the nozzle casing.

9. The flue gas recirculation combustor of claim 5, wherein an inlet end of the premix flow path is provided at a nozzle-side end of the sleeve and an outlet end of the premix flow path is provided at a side of the nozzle casing and in communication with a space between the movable member and the closed end of the nozzle casing.

10. A flue gas recirculation combustor comprising:
    a combustor chamber configured to receive fuel and combustion gas to cause combustion, the combustor chamber including a nozzle-side end and a combustor outlet;
    a nozzle can connected to the nozzle-side end of the combustor chamber;
    a plurality of nozzles disposed in the nozzle can and arranged such that an injection direction thereof is directed to a side of the combustor chamber; and
    a sleeve disposed in a premixing space defined between the nozzle can and the nozzle-side end of the combustor chamber, the sleeve including
       a plurality of bypass paths and at least one ejector nozzle, wherein
          the ejector nozzle is arranged between one bypass path and a neighboring bypass path, the plurality of bypass paths being arranged at a predetermined interval on an inner surface of the sleeve along a circumferential direction, and the ejector nozzle including a nozzle casting, an injection control needle assembly disposed in the nozzle casting, a combustor flow path connecting at least one point of the nozzle casting and the nozzle-side end of the combustor chamber, and a premix flow path connecting a side of the nozzle casting and the premixing space.

11. The flue gas recirculation combustor of claim 10, wherein the nozzle casing has a cylindrical shape with a closed end, the nozzle casing including a narrowed portion provided at an open end of the nozzle casing to inject gases from the combustor chamber to the premixing space, and a partition longitudinally dividing the nozzle casing.

12. The flue gas recirculation combustor of claim 11, wherein the injection control needle assembly includes
 a needle arranged longitudinally at a center of the nozzle casing,
 a movable member arranged at an end of the needle to move the needle horizontally along the center of the nozzle casing,
 a first elastic member arranged between the partition of the nozzle casing and the movable member, and
 a second elastic member provided between the movable member and the closed end of the nozzle casing.

13. The flue gas recirculation combustor of claim 12, wherein the injection control needle assembly further includes an elasticity adjusting member arranged at the closed end of the nozzle casing to be connected to the second elastic member.

14. A flue gas recirculation combustor comprising:
 a combustor chamber configured to receive fuel and combustion gas to cause combustion, the combustor chamber including a nozzle-side end and a combustor outlet;
 a nozzle can connected to the nozzle-side end of the combustor chamber;
 a plurality of nozzles disposed in the nozzle can and arranged such that an injection direction thereof is directed to a side of the combustor chamber: and
 a sleeve disposed in a premixing space defined between the nozzle can and the nozzle-side end of the combustor chamber, the sleeve including one or more ejector nozzles, the one or more ejector nozzles including
  a nozzle casing,
  an injection control needle assembly disposed in the nozzle casing,
  a combustor flow path connecting at least one point of the nozzle casing and the nozzle-side end of the combustor chamber, and
  a premix flow path connecting a side of the nozzle casing and the premixing space,
 wherein an inlet end of the combustor flow path is connected to the nozzle-side end of the combustor chamber and an outlet end of the combustor flow path is connected to a side of the nozzle casing, the outlet end including
  a combustor pressure path communicating with a space between the partition and the movable member, and
  a recirculation flow path communicating with an injection path in the nozzle casing.

15. The flue gas recirculation combustor of claim 14, wherein an inlet end of the premix flow path is provided at a nozzle-side end of the sleeve and an outlet end of the premix flow path is provided at a side of the nozzle casing and in communication with a space between the movable member and the closed end of the nozzle casing.

16. The flue gas recirculation combustor of claim 14, wherein the one or more ejector nozzles are provided on an inner surface of the sleeve along a circumferential direction.

* * * * *